United States Patent
Buchanan et al.

(10) Patent No.: US 6,610,264 B1
(45) Date of Patent: *Aug. 26, 2003

(54) PROCESS AND SYSTEM FOR DESULFURIZING A GAS STREAM

(75) Inventors: John Scott Buchanan, Trenton, NJ (US); Joseph F. Sodomin, III, Landenberg, PA (US); David L. Stern, Lawrenceville, NJ (US); Gerald J. Teitman, Vienna, VA (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/435,920

(22) Filed: May 5, 1995

Related U.S. Application Data

(63) Continuation-in-part of application No. 08/391,822, filed on Feb. 21, 1995, now abandoned, which is a continuation of application No. 08/281,499, filed on Jul. 27, 1994, now abandoned, which is a continuation of application No. 08/063,473, filed on May 19, 1993, now abandoned, which is a continuation of application No. 07/868,432, filed on Apr. 15, 1992, now Pat. No. 5,229,091, application No. 08/435,920, which is a continuation-in-part of application No. 08/435,914, filed on May 5, 1995, now Pat. No. 5,557,648, which is a continuation-in-part of application No. 08/184,536, filed on Jan. 21, 1994, now Pat. No. 5,591,417, which is a continuation-in-part of application No. 08/063,473, which is a continuation of application No. 07/868,432.

(51) Int. Cl.⁷ .......................... B01D 53/48; B01D 53/62
(52) U.S. Cl. .............. 423/242.1; 423/222; 423/244.01; 423/244.02; 423/244.06; 423/244.07; 423/573.1; 423/574.1; 423/576.8
(58) Field of Search ................. 423/222, 242.1, 423/244.01, 244.06, 244.07, 244.02, 574.1, 576.8, 247, 573.1; 502/524, 527, 527.19

(56) References Cited

U.S. PATENT DOCUMENTS

| | | | |
|---|---|---|---|
| 3,832,445 A | 8/1974 | Kouwenhoven et al. | 423/244 |
| 3,989,798 A | 11/1976 | Greene et al. | 423/244 |
| 4,122,150 A * | 10/1978 | Hori et al. | 423/242 |
| 4,274,981 A * | 6/1981 | Suzuki et al. | 252/438 |
| 4,692,318 A | 9/1987 | Tolpin et al. | 423/239 |
| 4,725,417 A | 2/1988 | Deschamps et al. | 423/244 |
| 4,836,993 A | 6/1989 | Bertolacini et al. | 423/244 |
| 5,023,063 A * | 6/1991 | Stiles | 423/239 |
| 5,082,820 A * | 1/1992 | Mitsui et al. | 502/350 |
| 5,108,979 A * | 4/1992 | Magnabosco et al. | 502/304 |
| 5,176,888 A * | 1/1993 | Stiles | 423/239 |
| 5,229,091 A * | 7/1993 | Buchanan et al. | 423/244.01 |
| 5,458,861 A * | 10/1995 | Buchanan et al. | 423/244.1 |
| 5,514,351 A * | 5/1996 | Buchanan et al. | 423/220 |
| 5,547,648 A * | 8/1996 | Buchanan et al. | 423/210 |
| 5,591,417 A * | 1/1997 | Buchanan et al. | 423/210 |
| 5,728,358 A * | 3/1998 | Avidan et al. | 423/244.01 |
| 5,741,469 A * | 4/1998 | Bhore et al. | 423/244.01 |

FOREIGN PATENT DOCUMENTS

EP A1 0215709 3/1987

* cited by examiner

Primary Examiner—Stanley S. Silverman
Assistant Examiner—Timothy C. Vanoy
(74) Attorney, Agent, or Firm—Malcolm D. Keen

(57) ABSTRACT

A process and system is disclosed for removing sulfur from tail-gas emitted from a Claus sulfur recovery process. First, the tail-gas is oxidized so as to convert sulfur therein to sulfur oxides. Oxidized tail-gas is directed into an absorber where a solid absorbent absorbs substantially all the sulfur oxides thereon. After allowing sufficient time for a desired amount of sulfur oxides to be absorbed, absorption is ceased. Next, the solid absorbent containing the absorbed sulfur oxides is contacted with a reducing gas so as to release an off gas containing hydrogen sulfide and sulfur dioxide. Upon releasing sulfur from the solid absorbent, the solid absorbent is regenerated and redirected into the absorber. Sulfur in the off gas emitted by regeneration is concentrated to an extent sufficient for use within a Claus sulfur recovery process for conversion to elemental sulfur. By combining this process with a Claus sulfur recovery process, sulfur dioxide emissions can be reduced to less than about two parts per million.

42 Claims, 3 Drawing Sheets

PROCESS AND SYSTEM FOR DESULFURIZING A GAS STREAM

CROSS-REFERENCE TO RELATED APPLICATIONS

This application is a continuation-in-part of application Ser. No. 08/391,822, filed Feb. 21, 1995, now abandoned, which is a continuation of application Ser. No. 08/281,499, filed Jul. 27, 1994, now abandoned, which is a continuation of application Ser. No. 08/063,473, filed May 19, 1993, now abandoned, which is a continuation of application Ser. No. 07/868,432, filed Apr. 15, 1992, and now U.S. Pat. No. 5,229,091. This application is also a continuation-in-part of application Ser. No. 08/435,914, filed May 5, 1995, now U.S. Pat. No. 5,557,648, which is a continuation-in-part of application Ser. No. 08/184,536, filed Jan. 21, 1994, now U.S. Pat. No. 5,591,417, which is a continuation-in-part of application Ser. No. 08/063,473, filed May 19, 1993, now abandoned, which is a continuation of application Ser. No. 07/868,432, filed Apr. 15, 1992, now U.S. Pat. No. 5,229,091.

FIELD OF THE INVENTION

This invention relates to a process for extracting sulfur from a gas containing hydrogen sulfide and sulfur oxides. The invention is particularly adapted for desulfurizing exhaust gas from a Claus unit. The process also works on other sulfur-containing gas streams, e.g., light, saturated hydrocarbons, hydrogen or carbon monoxide gas streams containing $H_2S$ and/or sulfur oxides.

BACKGROUND OF THE INVENTION

In the Claus process, elemental sulfur is produced by reacting $H_2S$ and $SO_2$ in the presence of a catalyst. The Claus system uses a combustion chamber which, at 950° to 1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The different stages of the process may be represented by the following equations:

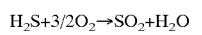  (I)

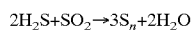  (II)

The overall reaction is:

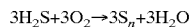  (III)

Below 500° C., the symbol n has a value of approximately 8.

The final Claus exhaust gas still contains small amounts of $H_2S$, $SO_2$, $CS_2$, carbon oxysulfide, CO, and elemental sulfur in the form of a vapor or mist. The exhaust gas can be subjected to post-combustion to convert substantially all sulfur species to sulfur oxides ($SO_2$ and $SO_3$), which are then emitted into the atmosphere.

Sulfur emitted as sulfur oxides ("$SO_x$") into the atmosphere with the exhaust gas may amount to 2–6% of the sulfur contained in the feed gas in the form of $H_2S$. In view of air pollution and the loss of sulfur involved, further purification is imperative.

Claus after-treatments have been developed. These are carried out after the last Claus stage or after the post-combustion. These after-treatments are, however, complicated and expensive or inadequate.

One after-treatment, carried out before post-combustion, seeks to achieve by catalytic conversion as complete a reaction as possible between $H_2S$ and $SO_2$. The reaction temperature is lowered to below the condensation point of sulfur, whereby the reaction equilibrium corresponding to equation II is shifted to form sulfur. A distinction is made between dry processes using alternating reactors in which the catalyst is intermittently charged with sulfur and discharged, and processes where $H_2S$ and $SO_2$ react in a high-boiling catalyst-containing liquid to form elemental sulfur which is drawn off continuously as a liquid product.

Unfortunately, in these processes any deviation from the optimum $H_2S:SO_2$ ratio in the Claus exhaust gas results in a reduced sulfur yield. No appreciable conversion of sulfur compounds such as COS and $CS_2$ occurs. Sulfur recovery efficiency of Claus using this form of after-treatment is limited to 98–99%. Cyclic operation, with alternating reactors, requires at least two reactors and much valves and piping.

A second after-treatment catalytically hydrogenates $SO_2$ and S with $H_2$ and CO while COS and $CS_2$ are simultaneously hydrolyzed with $H_2O$ into $H_2S$ which can be treated conventionally.

Hydrogenation/hydrolysis does not require a stoichiometric $H_2S/SO_2$ ratio in the Claus exhaust gas. It almost completely converts COS and $CS_2$ so that sulfur yields of more than 99.8% can eventually be obtained. This process incurs high capital expenditures for elaborate apparatus. It also consumes substantial energy. Recycle of $H_2S$ reduces the Claus system capacity, while the production of waste water containing harmful constituents presents additional problems. In addition, the treatment (such as amine absorption) used to remove $H_2S$ is generally ineffective for removing unconverted COS and $CS_2$. Total emissions of reduced sulfur species are typically around 10 ppm by volume with this after treatment.

A third after-treatment oxidizes all sulfur compounds into $SO_x$ which is then further processed. Thee processes are downstream of the post-combustion and therefore independent of the mode in which the Claus system is run. There are also dry processes, where $SO_2$ is adsorbed and returned to the Claus unit or processed to form sulfuric acid, and wet processes, where $SO_2$ is removed by absorptive scrubbing and further processed. For complete oxidation of COS and $CS_2$ into $SO_2$, the energy requirements are high and following the after-combustion, very large exhaust gas flows have to be treated.

The equilibrium conversion of the Claus reaction (equation II) may be improved by condensing out part of the water in the gas. The gas is then reheated and charged to another Claus stage to form elemental sulfur. This produces waste water which is highly corrosive due to the formation of thiosulfuric acid, polythionic acids and sulfurous acid. Processing of such waste water is expensive. Unavoidable formation of deposits of elemental sulfur also occurs during $H_2O$ condensation. Moreover, there is no conversion of COS and $CS_2$ so the maximum recovery of sulfur is about 98%. As a result of these disadvantages, this process has not been used on a commercial scale.

Where the after-treatment involves conversion of all sulfur compounds into hydrogen sulfide, it is also known to oxidize part of said hydrogen sulfide with air into $SO_2$ or to convert part of the sulfur produced into sulfur dioxide and thereafter catalytically to convert the remaining hydrogen sulfide with sulfur dioxide at 125°–150° C. in fixed-bed reactors into sulfur. The sulfur loaded catalyst is regenerated by passing hot oxygen-free gases containing hydrogen sulfide through the catalyst. This avoids the disadvantages associated with the first type of after-treatment, such as dependence on $H_2S/SO_2$ ratio and $COS/CS_2$ content in the Claus exhaust gas. Disadvantages of this process are the high capital cost and the higher $H_2S+SO_2$ input concentration for the low-temperature reactor caused by the admixture of a separately produced flow of $SO_2$. The maximum conversion overall efficiency obtainable with this process approaches 99%.

An after-treatment process which oxidizes all sulfur compounds into $SO_2$ is exemplified by Groenendaal et al. in U.S. Pat. No. 3,764,665 which issued on Oct. 9, 1973. This patent disclosed a process for removing sulfur oxides from gas mixtures with a solid acceptor for sulfur oxides wherein the solid acceptor is regenerated with a steam-diluted reducing gas and the regeneration off-gas is fed to a Claus sulfur recovery process. The improvement comprises cooling the regeneration off-gas to condense the water vapor contained therein, contacting the cooled off-gas with a sulfur dioxide-selective liquid absorbent, passing the fat liquid absorbent to a buffer zone and then to a stripping zone wherein the absorbed $SO_2$ is recovered from the liquid absorbent and is supplied to the sulfur recovery process. By operating in this manner, fluctuations in the sulfur dioxide concentration of the regeneration off-gas were leveled-out and a relatively concentrated sulfur dioxide stream was supplied to the sulfur recovery process at a substantially constant rate.

Although this process supplies relatively concentrated sulfur dioxide to the sulfur recovery process at a substantially constant rate, the off-gas must be cooled and the fat liquid absorbent must be transferred to a buffer zone before the absorbed $SO_2$ can be stripped. Therefore, what is needed is a simpler process whereby these steps are eliminated and energy costs reduced.

SUMMARY

This invention is directed to a process for removing substantially low concentrations of sulfur from a gas stream. Via this process a solid absorbent is used to remove sulfur oxides when said absorbent is regenerated with a hydrocarbon or hydrogen reducing gas which produces an off-gas. This off-gas is passed to a Claus sulfur recovery process. Initially, an oxygen containing gas is introduced along with an exhaust or tail-gas into an incinerator under conditions sufficient to convert substantially all of the sulfur therein into sulfur oxides. Afterwards, the resultant gas with sulfur oxides therein is directed into an absorber where substantially all of the sulfur oxides are absorbed on a solid absorbent. The resultant gas is allowed to remain in the absorber for a time sufficient for a desired amount of sulfur oxides to be absorbed on the solid absorbent. Gases emitted from the absorber, which are substantially depleted of sulfur oxides, are released to the atmosphere. Gases released into the atmosphere contain less than about 2 ppm of sulfur oxides therein.

When sufficient sulfur oxides have been absorbed on the solid absorbent, absorption is ceased. Next, the solid absorbent is regenerated by contacting it with a hydrocarbon or hydrogen reducing gas under conditions sufficient to cause absorbed sulfur oxides to release thereby forming a sulfur dioxide/hydrogen sulfide off-gas and a regenerated solid absorbent. The sulfur dioxide/hydrogen sulfide, off-gas is released in a concentration sufficient to be removed or converted by a Claus sulfur recovery process. Thereafter, the off-gas is directed to a Claus sulfur recovery process where it is converted into elemental sulfur. Besides sulfur dioxide and hydrogen sulfide the off-gas may contain water and unconverted reducing gas. It is preferable to release sulfur during regeneration primarily in the form of $SO_2$, rather than $H_2S$, since the recycle of $SO_2$ to the front of the Claus plant will entail a lower air demand by the Claus plant. If $H_2S$ is fed to the Claus plant in the off-gas, then extra air would be needed, which would reduce the processing capacity of the Claus plant.

It is therefore an object of this invention to concentrate sulfur contained in an exhaust or tail-gas in amounts sufficient for removal by a Claus sulfur recovery process.

It is another object of this invention to improve the efficiency for the removal of sulfur compounds from an exhaust or tail-gas emitted from a Claus sulfur recovery process.

It is yet another object of this invention to protect the environment by lowering substantially the concentration of sulfur compounds emitted to the atmosphere.

It is a further object of this invention to provide for a dry bed absorbent process for use in reducing sulfur in an exhaust or tail-gas in combination with a Claus sulfur recovery unit to obtain substantially reduced total sulfur emissions of less than about 2 ppm.

It is a still yet further object of this invention to provide for a dry bed absorbent process for removing sulfur from an exhaust or tail-gas so as to eliminate waste disposal problems which are inherent in other processes.

It is a still even yet further object of this invention to provide for a dry bed absorbent process for the recovery of sulfur from an exhaust or tail-gas and thereby obtain carbon monoxide conversion due to the process' substantially high operation temperatures.

It is a yet still even further object of this invention to provide for a method which will convert substantially all of the sulfur compounds in a tail-gas or exhaust gas to sulfur dioxide so as to reduce the oxygen demand upon oxidation of said stream which effectively increases the treating capacity of a Claus sulfur recovery plant.

DESCRIPTION OF THE PREFERRED EMBODIMENTS

Figure 1:
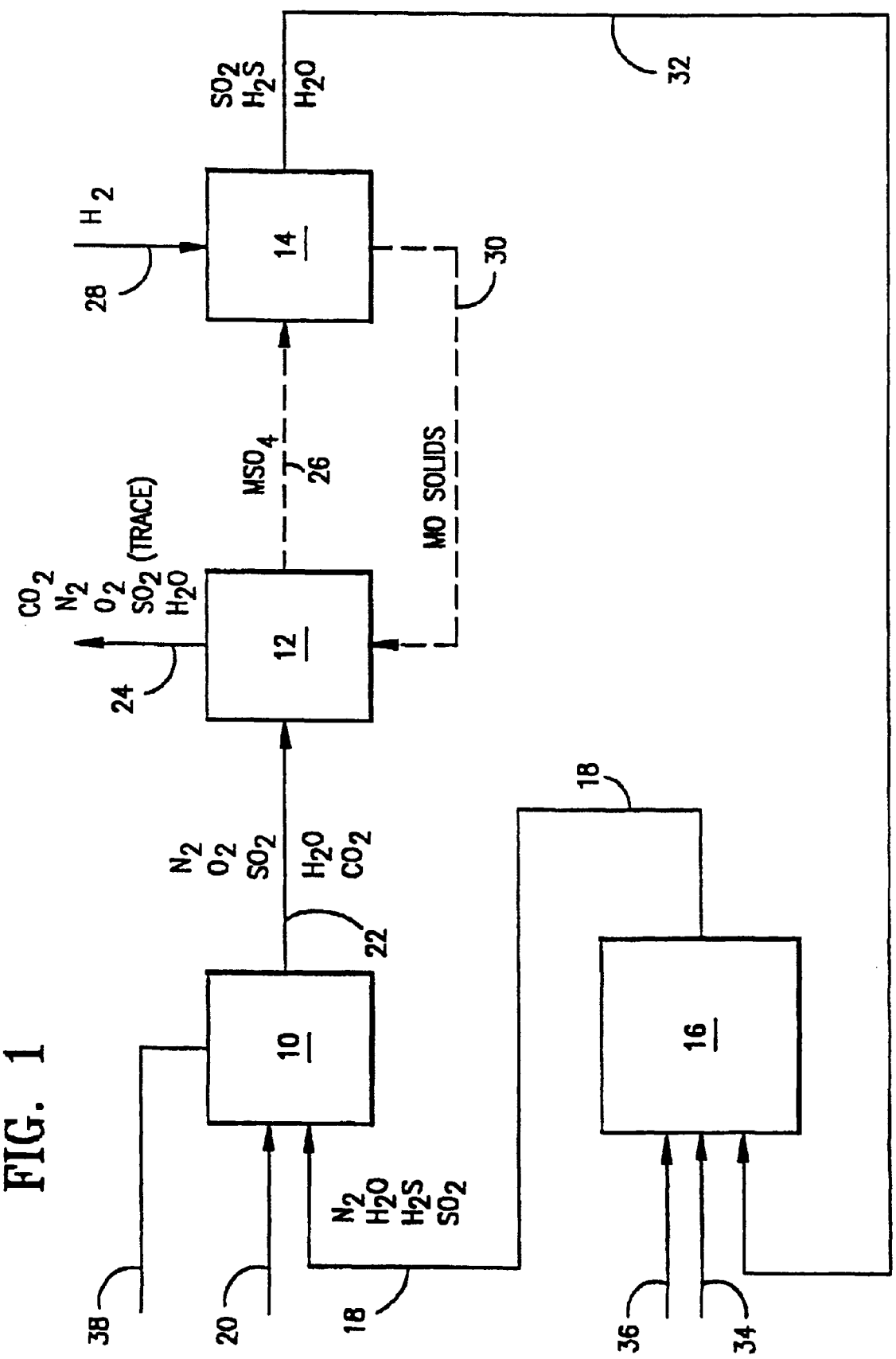
FIG. 1 is a schematic representation of a desulfurization process wherein a moving solid bed absorbent is utilized.

In the practice of this invention, referring to the FIG. 1, exhaust, or tail-gas from a Claus recovery process 16 is directed into an incinerator 10 via tail-gas conduit 18. This tail-gas is obtained from the Claus sulfur recovery process 16 by combining air via conduit 34 with an acid gas from acid gas conduit 36 into a Claus sulfur recovery process 16. A process for the reduction of the sulfur content in a gaseous stream wherein a Claus sulfur recovery process or unit is utilized is disclosed in U.S. Pat. No. 4,857,297 which issued to Kettner et al. on Aug. 15, 1989. This patent is hereby incorporated by reference herein. Tail-gas which enters incinerator 10 contains sulfur dioxide, hydrogen sulfide, water, and nitrogen plus minor amounts of COS, $NH_3$, nitrogen oxides, carbon monoxide, and carbon dioxide. Sulfur dioxide and hydrogen sulfide contained in the tail-gas is in a concentration too low to be removed by a Claus process. The concentration is also too high for emission into the atmosphere. Air is next directed into incinerator 10 via incinerator air conduit 20.

Incinerator 10 is operated at a temperature sufficient to convert the hydrogen sulfide gas into sulfur oxides. This temperature will be about 900° to about 1,350° F. The preferred temperature is about 1,200° F. After the oxidized tail-gas has been in incinerator 10 for a time sufficient to convert substantially all of the hydrogen sulfide to sulfur oxides, it is directed from incinerator 10 to absorber 12 via incinerator exit gas conduit 22. The gas which exits incinerator 22 contains water, sulfur oxides, oxygen, carbon dioxide, and nitrogen.

When gas exiting incinerator 10 enters absorber 12, it is contacted with the solid absorbent which absorbs substantially all of the sulfur oxides. The sulfur oxide-capturing absorbent can be in the form of balls, pebbles, spheres, extrudates, channeled monoliths, microspheres or pellets. This sulfur oxide-capturing absorbent provides absorbers or acceptors which absorb, and collect, or otherwise remove sulfur oxides from the influent gaseous stream. In the most preferred embodiment, the bed of granular material is a bed of sulfur-oxide capturing absorbents, which serve as sulfur oxide absorbers or acceptors. In the moving bed embodiment referred to in the drawing, solid absorbent is removed from absorber 12 by gravity. It moves by gravity since the absorbent is positioned in absorber 12 at an angle that causes it to move at a rate so as to allow maximum absorption of sulfur oxides. The flow rate of the solid absorbent through absorber 12 is such as to allow the absorption of about 10 to about 60 weight % of sulfur oxides on the absorbent, most preferably about 20 to about 60 weight %. Once sufficient sulfur oxides have been absorbed by the absorbent, it flows by gravity from absorbent 12 via spent absorbent conduit 26 into regenerator 14. Gases, from which the sulfur has been substantially removed, are emitted from absorber 12 via absorbent exit gas conduit 24. The gas which is removed by conduit 24 contains water, traces of sulfur dioxide, oxygen and nitrogen. This emitted gas contains sulfur dioxide in an amount less than about 2 ppm. Nitrous oxides contained in this gas can be reduced by co-feeding ammonia or an ammonia-producing species such as urea into absorber 12.

Although a moving bed of absorbent may be used to remove the sulfur dioxide, it is preferred to contain the solid absorbent in a fixed bed. To accomplish this, a common vessel is used for both tail-gas absorption and also for absorbent regeneration. This is accomplished by appropriate valving so as to allow the flow of oxidized incinerator gas to the absorber to cease. Subsequently, the reducing gas is directed into the vessel and the regeneration stage is initiated. For continuity of operation, this is best accomplished by having two separate sets of vessels for both absorption and regeneration. As will be understood by those skilled in the art, when the absorbent is in a fixed bed embodiment, the atmosphere is merely swung from tail-gas (absorption) to reducing gas (regeneration) by appropriate valving. Greater specificity is obtained for the fixed bed method by reference to FIG. 2.

Figure 2:
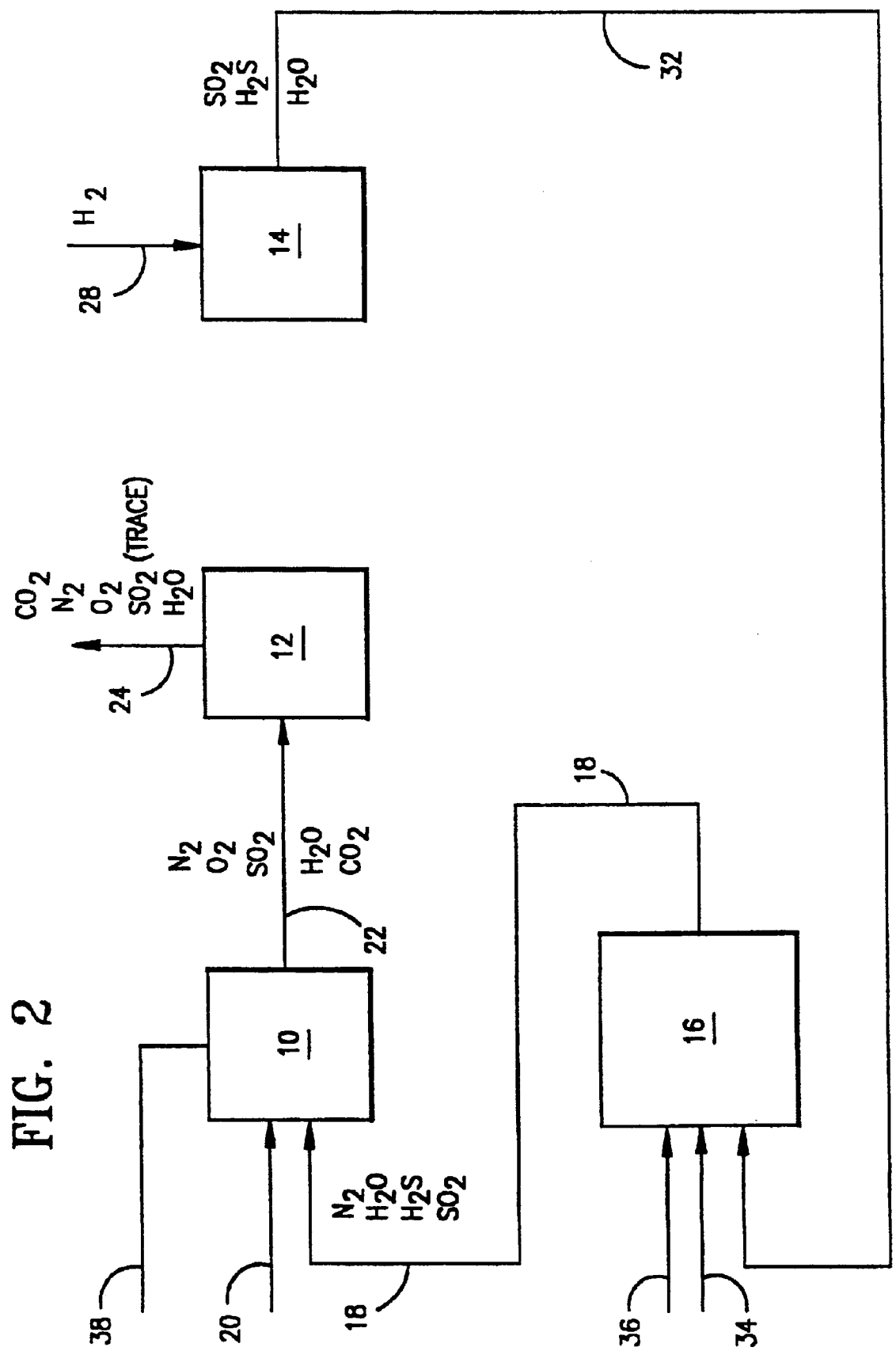
FIG. 2 is a schematic representation of a desulfurization process wherein a fixed solid bed absorbent is utilized.
Figure 4:
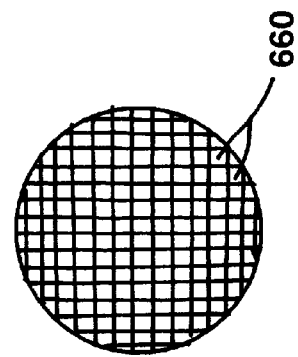
FIG. 4 is cross-section of a monolith taken along line IV—IV of FIG. 3.

As is shown in FIG. 2, the fixed bed method is similar to and follows the basic operating scheme as depicted in FIG. 1 which scheme is discussed above. The fixed bed method is better suited for those applications where less than about 4 psi of excess pressure drop is available. In most applications where the fuel gas is obtained from a Claus sulfur plant, the pressure drop will often be less than 4 psi. Although the fixed bed method is preferred for these applications, the fluidized bed is useful when sufficient driving pressure is available, because of its continuous operation capability and also because less hardware is required, i.e. fewer valves and pipes.

Referring now to FIG. 2, gas from incinerator 10 enters absorber 12 where it is contacted with the solid absorbent that absorbs substantially all of the sulfur oxides. The sulfur oxide-capturing absorbent, as mentioned above, can be in the form of balls, pebbles, spheres, pellets, extrudates, channel monoliths, or microspheres. These oxide-capturing absorbents absorb and collect, or otherwise remove substantially all of the sulfur oxides from the gases coming into absorber 12. Gases, from which sulfur oxides have been substantially removed, are emitted from absorber 12 via spent absorbent exit conduit 24. Those gases that exit absorber 12 via conduit 24 are monitored until sulfur oxide "break through" occurs. Sulfur dioxide concentration is monitored with an ultraviolet or infrared analyzer. Of course, as will be understood by those skilled in the art, other comparable analyzing equipment can be utilized.

Sulfur dioxide "break through" occurs when a substantial increase in the concentration of sulfur dioxide occurs in the effluent from absorber exit conduit 24. As anticipated, this increase will be from under 2 ppm to about 250 ppm in less than about 3 minutes.

When sulfur dioxide "break through" is detected, oxidized tail-gas from incinerator 10 is directed into a second vessel which then becomes absorber 12. In a preferred mode of operation, if sulfur dioxide breakthrough is detected during one absorption cycle, the duration of succeeding cycles is reduced by about 5% from the original absorption time, such that regeneration at the succeeding cycles is initiated before $SO_2$ breakthrough occurs. Original absorber 12 now containing the sulfur oxide loaded oxide-capturing absorbent is now transformed into regenerator 14 by closing off the tail-gas flow from incinerator 10 and directing hydrogen into the regenerator via hydrogen conduit 28. During the regeneration of the absorbent the temperature is maintained between about 900 to about 1,400° F., preferably about 1,100 to about 1,300° F. During the regeneration, a reducing gas, preferably hydrogen, is directed into regenerator 14 in about 0.10 to about 10 vol %, preferably about 2 to about 4 vol %. Pressure in the regenerator is maintained at about 0.10 to about 10 atmospheres, preferably about 0.5 to about 3 atmospheres. The gas hourly space velocity (GHSV) is about 10 to about 1,000, preferably 100 to about 150.

While the operating parameters for the regenerator are equally applicable to both the fluidized and the fixed bed processes, initially a GHSV of about 300 should be used when commencing regeneration of the fixed bed absorbent so that a higher concentration of liberated gases can be removed from the regenerator. As regeneration proceeds, the GHSV can be reduced to about 50 as the concentration of liberated gases diminishes. Similarly, although hydrogen is the preferred reducing gas, other hydrocarbon reducing gases can be used. These will preferably comprise $C_1$ through $C_5$ hydrocarbons. Substantially improved regeneration results are anticipated when water is co-fed into the regenerator along with the hydrocarbons. Once regeneration is completed, liberated sulfur dioxide, hydrogen sulfide, and water are removed from regenerator 14 via regenerator effluent conduit 32 and directed into Claus plant 16 for further treatment.

Whether operating under the fluidized or fixed bed method, it is preferred to operate absorber 12 at a temperature from about 900 to about 1,400° F. A temperature of from about 1,100 to about 1,300° F. is most preferred. Oxygen should be introduced into absorber 12 in an amount of from about 0.10 to about 10 vol %, 2 to about 4 vol % is preferred. Pressure within absorber 12 should be maintained at a pressure of from about 500 to about 20,000 GHSV, 3,000 to about 5,000 GHSV is preferred. An additional benefit of operating absorber 12 within these parameters is that any carbon monoxide therein is converted into carbon dioxide which is released into the environment. Other gases released from absorber 12 include nitrogen, oxygen, and trace amounts of sulfur dioxide along with water.

Operating conditions for incinerator 10 are similar when using either the fluidized or fixed bed method. Preferably, the temperature is maintained at from about 900 to about 1,400° F., most preferably between about 1,100 to about 1,300° F. Oxygen is introduced into the absorber in an amount of from about 0.1 to about 10 vol %, preferably 2 to about 4 vol %. Pressure in the absorber should be maintained at about 0.1 to about 10 atmospheres, preferably about 1.5 to about 3 atmospheres. The GHSV should be maintained at about 400 to about 7,000, preferably about 500 to about 2,500. In those situations where it is required fuel gas can be introduced into incinerator 12 via fuel gas conduit 38 as shown in FIG. 2.

Absorbents which can be utilized preferably comprise substantially alumina, and most preferably alumina compounded with magnesia, for best results. Gamma ($\gamma$) alumina, chi-eta-rho ($\eta\rho$)alumina, delta ($\delta$) alumina, and theta alumina are particularly useful as adsorbents and supports because of their high surface areas. The term "adsorbent" is used interchangeably herein with the term "absorbent." While alpha ($\alpha$) alumina and beta ($\beta$) alumina can be used as adsorbents, they are not as effective as gamma, chi-eta-rho, delta and theta alumina. One or more oxides of other metals can also be used as adsorbents, either alone or in combination with alumina or as spinels, such as bismuth, manganese, yttrium, antimony, tin, copper, Group 1a metals, Group 2a metals, rare earth metals, and combinations thereof. Magnesium aluminate spinels are particularly useful as adsorbers. Lanthanum and cerium are preferred rare earth metals. Naturally occurring rare earths, such as in the form of baestenite, are also useful adsorbers. Elemental copper or copper compound adsorbers, such as copper oxide adsorbers, can also be used. The copper oxide can be cuprous oxide ($Cu_2O$) and/or cupric oxide (CuO). Other copper compounds can be used, such as copper (II) sulfate, copper (II) acetate, copper (II) formate, copper (II) nitrate and/or copper (II) chloride. The adsorbers can also be a blend/mixture of high density and low density materials, such as of the above-identified metal oxides.

The metal or metal oxide part of the adsorbers can be supported, carried and held on a refractory support or carrier material which also provides part of the adsorbers. The support controls the attrition and surface area characteristics of the adsorbers. The support preferably has a surface area greater than about 10 $m^2/g$ and most preferably from about 50 $m^2/g$ to about 500 $m^2/g$ for best results. Suitable supporters include, but are not limited to, silica, alumina, kaolin or other clays, diatomaceous earth, boria, and/or mullite. The support can comprise the same material as the metal or metal oxide part of the adsorbers.

The adsorbers can be impregnated or otherwise coated with an oxidizing catalyst or promoter that promotes the removal of nitrogen oxides and the oxidation of $SO_2$ to $SO_3$ in the presence of oxygen. It is believed that $SO_3$ is more readily adsorbed than $SO_2$. One useful catalyst is ceria (cerium oxide). Another useful catalyst is platinum. Other catalytic metals, both free and in a combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver, and combinations thereof. The promoter can comprise the same material as the adsorber. An even distribution of the promoter is preferred for best results and to minimize adsorbent erosion.

The Group 1a metals, Group 2a metals, and Group 8 metals referred to are those listed in the Periodic Table of the Elements in the *Handbook of Chemistry and Physics* (54th Edition). Useful Group 1a metals include lithium, sodium, potassium, rubidium, and cesium. Useful Group 2a metals include magnesium, calcium, strontium, and barium. Useful Group 8 metals are the Group 8 noble metals (the platinum family of metals) including ruthenium, rhodium, palladium, osmium, iridium, and platinum. The rare earth metals are also useful and are referred to as the lanthanides. Suitable rare earth metals include cerium, praeseodymium, neodymium, samarium, europium, gadolinium, terbium, dysprosium, holmium, erbium, thulium, ytterbium, and lutetium.

The above-mentioned adsorbents are discussed in U.S. Pat. No. 4,692,318 which issued to Tolpin et al. on Sep. 8, 1987. This patent is hereby incorporated by reference herein. Applicant's U.S. Pat. No. 5,229,091 is also incorporated herein by reference.

Although the adsorbents mentioned above are exemplary of the ones which can be used in the process to remove sulfur dioxide, the preferred adsorbents are detailed in Examples 1 through 4 below.

Spent absorbent from absorber 12 which has been directed into regenerator 14 is subjected to temperatures from about 900 to about 1,300° F. Also, a hydrocarbon or hydrogen reducing gas is directed into regenerator 14 via hydrogen conduit 28. The conditions are such in the regenerator so as to cause substantially hydrogen sulfide and sulfur dioxide to be released from the solid absorbent as an off-gas. Regenerated solid absorbent is removed from regenerator 14 when operated in the moving bed mode via regenerated absorbent conduit 30. Conduit 30 directs the regenerated absorbent back into absorber 12. The solid absorbent can also be regenerated and reconstituted in the presence of water so as to further enhance its activity for the adsorption of sulfur oxides. Under the preferred conditions, sulfur is released from the adsorbent primarily in the form of sulfur dioxide in an amount of from about 80 to about 90 weight % during the regeneration or desorption step. Trace amounts of hydrogen sulfide also appear in the gases which are released from the absorbent doing regeneration or desorption. Off-gases which are emitted from the absorbent in regenerator 14 are removed therefrom via regenerator effluent conduit 32 where it proceeds into a Claus sulfur recovery process or plant 16 where elemental sulfur is recovered. Although the preferred embodiment has been discussed above and depicted in the drawings, other embodiments can be obtained that will be readily apparent to those skilled in the art.

In order to further demonstrate the working of this process, the following tests demonstrate the effectiveness of the method and the best mode known for operating the process.

EXAMPLE 1

A ceria/alumina sorbent was prepared by impregnating high pore value gamma alumina (1/8" extrudate from Dycat International) with a solution of 32.7 grams $Ce(NO_3)_6 \cdot 6H_2O$ from Aldrich Chemical Company in 45 grams of water, using an incipient wetness technique. The material was dried for three hours at 120° C. (248° F.) and calcined one hour at 700° C. (1,292° F.), in air. The composition was approximately 11% $CeO_2/Al_2O_3$. This material was crushed and sieved to 14/60 mesh (API).

EXAMPLE 2

A magnesium aluminate sorbent was prepared, starting with two solutions. Solution I contained 461.5 grams magnesium nitrate, 68.6 grams of concentrated nitric acid, and 500 mls of water. Solution II contained 209.7 grams sodium aluminate, 10.7 grams sodium hydroxide, and 500 mls of water. To Solution I were added 2 liters of water, and then over a 30 minute period, Solution II. Sodium hydroxide was then added in an amount to bring the pH up to 10.7. The resulting mixture was aged for 16 hours and then filtered. The recovered solids were dried at 170° C. (338° F.) for 12 hours and sized to 14/60 mesh (API). This material had a composition of about $Mg_2Al_2O_5$.

EXAMPLE 3

To make a sorbent with approximately 100 ppm platinum loading, 35 grams of the magnesium aluminate from Example 2 was impregnated using an incipient wetness technique with a solution of 0.013 gram of chloroplatinic acid (37% Pt. assay) in 16 mls of water. The resulting solids were calcined in air at 450° C. (810° F.) for three hours and sized to 14/60 mesh (API).

EXAMPLE 4

A sorbent with approximately 10% ceria loading on magnesium aluminate was prepared by adding a solution of 9.71 grams cerium nitrate in 16 mls of water to 35 grams of magnesium aluminate from Example 1, using an incipient wetness method. The material was then dried for three hours at 120° C. (248° F.), calcined in air one hour at 700° C. (1,292° F.), and sized to 14/60 mesh (API).

To test the sorbent ability to sorb sulfur oxides from a gas mixture simulating an incinerated Claus tail-gas, 6 grams of each material described in Examples 1–4 were loaded in an 11 mm I.D. quartz reactor with a central thermowell. The reactor was placed in a radiant furnace for rapid heating and cooling. A gas flow of 360 cc/minute with a composition of 1% sulfur dioxide, 4% oxygen, and 95% nitrogen (on a dry basis) was established through the reactor, after the desired sorption temperature was attained. Water, in the amount of about 20% of the gas flow, as added by directing part of the feed gases through a saturator held at about 150° F.

The sulfur dioxide content in the effluent stream was monitored with a Siemens Ultramat 22P infrared analyzer. A cold trap between the reactor and the analyzer removed most of the water on the effluent stream. Sorption experiments were terminated when the sulfur dioxide level in the effluent exceeded 250 ppm. Sulfur dioxide breakthrough was relatively sharp. In general, the analyzer detected no sulfur dioxide for the first 80–90% of the sorption period. Sulfur dioxide concentration of less than 2 ppm during this portion of the sorption was confirmed by measurements with Drager gas measurement tubes. The calculated weight percentage uptake of sulfur oxide as $SO_3$ during the sorption period is reported in Table 1.

Regeneration of the solid sorbent was accomplished by contacting it with hydrogen, which was bubbled through a saturator to obtain about 25% water vapor content. The composition of the off-gas during reductive regeneration was determined by injections onto a Hewlett-Packard 5890 gas chromatograph equipped with a thermal conductivity detector. Usually, both hydrogen sulfide and sulfur dioxide could be detected in the off-gas, but typically one gas or the other dominated, depending on the sorbent and on operating conditions, as indicated in Table 1 below.

TABLE 1

| Sorbent Material Identity | Temperature of Sorption and Regeneration, ° F. | Wt % Uptake During Sorption | Dominant Sulfur Compound In Regeneration Off-gas |
|---|---|---|---|
| $CeO_2/Al_2O_3$ (Ex. 1) | 1,000 | 4.8 | $H_2S$ |
| $CeO_2/Al_2O_3$ | 1,200 | 6.2 | $SO_2$ |
| $Mg_2Al_2O_5$ (Ex. 2) | 1,200 | 4.7 | $H_2S$ |
| $Pt/Mg_2Al_2O_5$ (Ex. 3) | 1,200 | 33.8 | $SO_2$ |
| $CeO_2/Mg_2Al_2O_5$ (Ex. 4) | 1,100 | 14.7 | $H_2S$ |
| $CeO_2/Mg_2Al_2O_5$ | 1,200 | 25.2 | $SO_2$ |

The uptake of $SO_x$ was greater for $Mg_2Al_2O_5$ promoted with Pt (Ex. 3) and with $CeO_2$ (Ex. 4) was higher than for $Mg_2Al_2O_5$ alone (Ex. 2). For the ceria-promoted materials (Examples 1 and 4), magnesium aluminate was a more effective sorbent than alumina, and increasing the operating temperature from 1,000–1,100° F. to 1,200° F. increased $SO_x$ sorption which shifted the dominant off-gas sulfur species from $H_2S$ to $SO_2$.

The GHSV for the hydrogen regeneration gas was about 40 hr$^{-1}$.

At that flow rate, the break point between $H_2S$ to $SO_2$ is about 1,100° F. It appears that increasing the flow rate of the regeneration gas will shift the break point to a higher temperature.

EXAMPLE 5

The carbon monoxide oxidation activity of two sorbents was tested by flowing a mixture of 4% carbon monoxide, 4% oxygen, and 8% carbon dioxide at a flow rate of 310 cc/min over 6 grams of each material in an 11 mm I.D. quartz reactor. Carbon monoxide and carbon dioxide concentration, as a function of reactor temperature, were monitored by Beckman Model 864 infrared analyzers. With the magnesium aluminate of Example 2, carbon monoxide was half converted at about 770° F. and substantially all converted at 860° F. With the platinum-promoted magnesium aluminate of Example 3, carbon monoxide was half-converted at about 510° F. and substantially all converted at 540° F. With an empty reactor, there was no detectable carbon monoxide conversion for temperatures up to 1,200° F.

This example demonstrates that the designated sorbents are effective in promoting the removal of carbon monoxide in the presence of oxygen.

Monoliths

In accordance with an aspect of the present invention, there is provided a system for desulfurizing a gas stream including sulfur oxides comprising an elongated monolith, which includes an inlet end, an outlet end and a plurality of longitudinally extending honeycombed structures. The honeycombed structures have solid absorbent on the inner surfaces thereof or are formed at least in part of solid absorbent.

Figure 3:
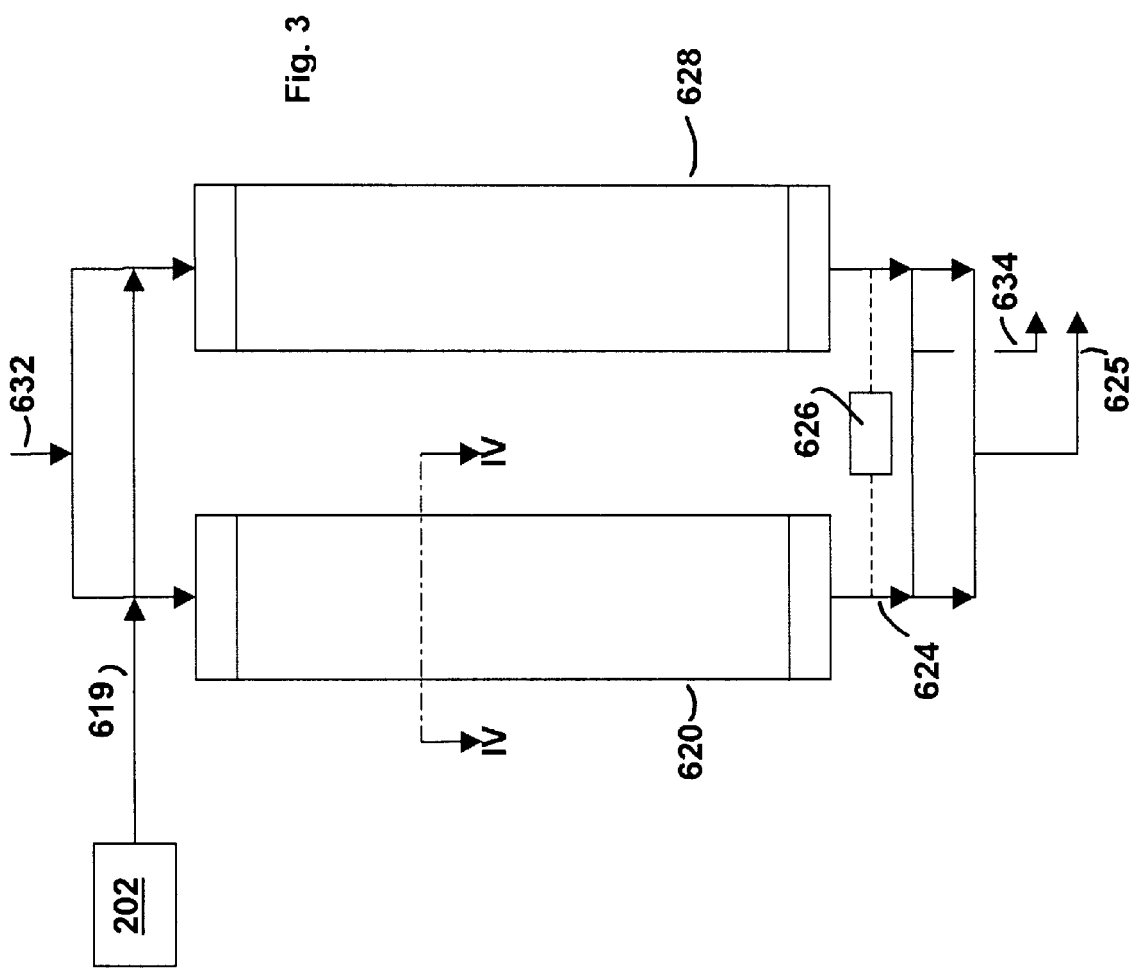
FIG. 3 is a schematic of a desulfurizing embodiment of the present invention including a monolith.

With reference to FIG. 3, there is shown another embodiment of the present invention wherein a pair of monolith reactors 620,628 are arranged as swing reactors to desorb a stream such as a FCC regenerator 202 fluegas stream 619 (or the claus tailgas 18) which includes SOx and CO because any hydrogen sulfide fed to the regenerator is completely converted to SOx in the regenerator 202. The sulfur oxide and CO containing gas stream 619 from the regenerator 202 is optionally cooled in a heat exchanger to within a range of from about 900° F. to about 1400° F., and is fed by the line 619 to the top of the first monolith reactor 620 in the system. Each one of the monoliths 620,628 is formed of solid absorbent with unobstructed longitudinal passages provided by honeycomb structures 660.

The solid absorbent monolith reactor 620 absorbs substantially all of the sulfur oxide from the sulfur oxide enriched gas stream 619 and converts the CO to $CO_2$ to provide a SOx and CO depleted gas stream through outlet conduit 624. The SOx and CO depleted stream is fed through a valve system (not shown) to a line 625 leading to an incinerator or to a stack.

While in an absorbent mode, each monolith reactor 620, 628 is operated at a temperature from about 900° F. to about 1,400° F. A temperature of from about 1,100° F. to about 1,300° F. is preferred. The oxygen content of the stream 219 entering the absorbent bed 620 is in an amount of from about 0.10 to about 10 volt, 2 to about 4 volt is preferred. Pressure within the reactor 620 should be maintained at a pressure of from about 0.1 to about 10 atmospheres, preferably from about 1.5 to about 3.0 atmospheres. GHSV should be from about 500 to about 20,000, and preferably from about 3,000 to about 5,000 GHSV. Operating the reactor 620 during the absorbent mode within these parameters converts substantially all carbon monoxide therein into carbon dioxide which is released into the environment. Other gases released from the reactor 620 include nitrogen, oxygen, and trace amounts of sulfur dioxide along with water.

The invention also contemplates that a fluegas stream from the overhead of the FCC regenerator 202 can be optionally fed through a furnace (not shown) to insure that the stream feed is within the foregoing temperature ranges.

The outlet conduit 624 of the first monolith 620 is monitored by a sensor 626 until sulfur dioxide break-through occurs. A suitable sensor is a Siemens Ultramat 22P infrared analyzer. Of course, as will be understood by those skilled in the art, other comparable analyzing equipment can be used.

Sulfur dioxide break-through occurs when a substantial increase in the concentration of sulfur dioxide occurs in the conduit 624. This increase will be in the order of from about 3 ppm to about 250 ppm.

When sulfur dioxide break-through is detected, the SOx and CO containing gas stream 619 is directed through a suitable valve system (not shown) into the top of the second monolith reactor 628. Concurrently, the valve system directs a hydrogen rich stream 632 to the first reactor 620 for regeneration. The hydrogen rich stream 632 may contain hydrogen and/or hydrocarbons and/or syngas.

During regeneration of the monolith reactor 620, the temperature is maintained between about 900° F. to about 1,400° F.; and the pressure in the reactor 620 is maintained at about 0.10 to about 10 atmospheres, preferably about 0.5 to about 3 atmospheres. The $H_2$ and/or hydrocarbon and or syngas stream 632 is directed into the reactor 620 at a gas hourly space velocity (GHSV) of about 10 to about 1,000, preferably about 100 to about 150. Initially, a GHSV of about 300 is preferred when commencing regeneration of a fixed-bed absorbent so that a higher concentration of liberated gases can be removed from the regenerator. As regeneration proceeds, the GHSV can be reduced to about 50 as the concentration of liberated gases diminishes.

Similarly, although hydrogen is the preferred reducing gas for regeneration, other hydrocarbon reducing gases can be used. These will preferably comprise $C_1$ through $C_5$ hydrocarbons. Substantially improved regeneration results are anticipated when water is co-fed into the reactor along with the hydrocarbons. The hydrogen and/or hydrocarbon and/or syngas stream 632 may contain 0.0 to 50% water. Also, syngas typically contains at least 10% hydrogen and at least 10% CO.

Regeneration of the reactor 620 provides a hydrogen sulfide and/or sulfur dioxide bearing stream through the outlet conduit 624, the valve system (not shown), and via line 634 to the sulfur plant for recovery of sulfur. The hydrogen sulfide and/or sulfur dioxide bearing stream may also contain water and unconverted reducing gas.

The sulfur oxide and CO containing stream 619 and the hydrogen and/or hydrocarbon and/or syngas bearing stream 632 are alternately fed to each one of the reactors 620,628, whereby each unit is first spent by sulfur oxides extracted from the stream 619, and then regenerated by the hydrogen and/or hydrocarbon and/or syngas bearing stream 632.

Compared to a conventional packed bed of solids, monoliths offer even lower pressure drop and less tendency to plug from the fine particles present particularly in FCC and coal combustion flue gas. Thus, this aspect of the invention is particularly suitable for processing flue gas from FCC regenerators and from power plants. As discussed hereinafter, SOx sorbents can form the channeled monolith, or be formed as part of the channel monoliths, or be coated onto suitable monolithic supports.

Plugging is generally caused by fines typically catalyst fines, which accumulated in an extrudate bed and eventually plug up flow. However, with a channeled monolith, particularly in a straight downflow, the fines tend to get carried straight through. Even in a horizontal flow mode, the fines will tend to lay along the bottom of the channels and will eventually be carried along and therefore would very unlikely plug the channels. Therefore, it is preferable that the flow through the monolith be downward or that the monolith be on its side when fines are a factor. However, an embodiment wherein a fine laden stream is processed upwardly would be functional.

The monolith suitably has from about 25 cell/in$^2$ to about 800 cell/in$^2$ as viewed from an end thereof, and preferably from about 50 cell/in$^2$ to about 400 cell/in$^2$. A commercial size monolith may be in the order of a 16 foot long cylinder having about an 8 foot diameter. When the monolith is formed of extruded absorbent, it is preferred that the raw absorbent have a surface area at least about 130 m$^2$/g and that each extruded honeycombed structure have a surface area at least about 90 m$^2$/g to 130 m$^2$/g, and more preferably at least 130 m$^2$/g. Also, each one of the honeycombed structures can be extruded and then a plurality of the structures can be joined together to form the structure. Although it is preferred that the monolith have a circular cross-section, any cross-sectional is contemplated by this invention.

One conventional ceramic monolithic catalyst structure suitable for this invention consists of a ceramic support with a coating of high surface material on which the catalyst is deposited. Specifically, the ceramic support is prepared by first sintering a mold of clay or other ceramic material at a high temperature to impart density and strength. This procedure results in the ceramic having a very small surface area, and consequently the ceramic is coated with another material having a higher surface area, as well as specific chemical characteristics, on which to actually deposit the catalyst. This procedure of depositing a high surface area coat on the low surface area ceramic wall is disclosed, for example, in U.S. Pat. Nos. 2,742,437 and 3,824,196.

It is also known from U.S. Pat. No. 4,631,268 to make monolithic catalyst structure by initially forming separate moldable bodies of the materials for each of two phases that will form the monolithic support. Specifically, a moldable composition of a high surface arm oxide and plasticizing/binding agent for an oxide, as the support phase, is prepared separately from a second moldable composition of a sinterable ceramic material and a plasticizing/binding agent for the ceramic, as the matrix phase. Each composition is formed into shapes which are then intermingled for subsequent extrusion though a die to form the monolithic supports.

Porous oxides suitable for use as the support phase material are those which, after calcining, have a surface area of at least 20 square meters per gram, preferably at least 60 square meters per gram, and most preferably at least 100 square meters per gram. Preferably, the oxide is alumina, silica, a spinel, titania, zirconia or a zeolite. Mixtures of the oxides can also be used. Other materials which are commonly used as catalyst supports and which have the above-described characteristics can also be used.

Aluminas useful in the preparation of the high surface area support phase of this monolith are those which, upon calcining, provide gamma-alumina or other transition aluminas having the needed surface area. Colloidal gamma-alumina can be used directly, or "alumina-precursors" such as alpha-alumina monohydrate, or aluminum chlorohydrate can also be used.

Spinels useful in this monolith system are the magnesium aluminate spinels used as catalyst supports, including spinal solid solutions in which magnesium is partially replaced by such other metals as manganese, cobalt, zirconium, or zinc.

High surface area silica that can be used in preparing the high surface area composition for the support phase are the amorphous silicas of about 1–10 microns or sub-micron particle size. Readily-available zeolites useful to prepare the high surface area composition include the crystalline aluminosilicate zeolites designated A, X, and Y, and silicalite.

The ceramic material which is the basis for the matrix phase of the monolith can be any of the well known sinterable materials capable of providing mechanical strength and good thermal properties in the monolithic supports. The ceramic is suitably selected from cordierte, mullite, talc, clay, zirconia, zirconia-spinal, lithium aluminosilicates, alumina, silica and alumina-zirconia composites.

To construct the monolith of U.S. Pat. No. 4,631,268, the plasticized masses of high surface area support material and those of ceramic matrix material may be separately molded or formed into discrete bodies and then intermingled for coextrusion through a die to form the final desired shape of the monolithic catalyst support. This method is particularly suited to making honeycomb supports. The support and matrix bodies are typically intermingled to form a composite body in which the support bodies constitute a distinct, preferably discontinuous, phase throughout. The support bodies should also be at least substantially uniformly distributed throughout the composite. A proper distribution will be provided by a ratio of matrix bodies to support bodies of at least about 1.3:1 preferably at least 1.5:1. The size and shape of the matrix bodies and support bodies may be about the same. Using these ratios, the monoliths formed from such a composite will contain about 10–40 percent by weight of the high surface phase.

In one embodiment, the plasticized masses of high surface area material and those of ceramic material are separately extruded though a die into elongated shapes, of rectangular, hexagonal or circular cross-section.

The extruded bodies are then assembled into a single composite body by intermingling the rods axially or longitudinally. This may be done so that the rods are positioned with at least a substantially uniform distribution. Also the ratio of matrix bodies to support bodies is at least 1.5:1. After firing, monoliths formed from such a composite will contain about 10–40 percent by weight of the high surface phase.

The monolith shapes are heated to a temperature and for a time sufficient to sinter the ceramic material. optionally, this heating/sintering step is preceded by drying the shapes at about 100°–120° C. The heating/sintering step generally takes place at 800°–1200° C., although when silicone resin is used as a binder for the ceramic matrix, particularly when the ceramic has a high alumina content, temperatures as low as 500° C. may be sufficient. Preferably, the temperature of the sintering step does not exceed about 1100°–1150° C. Despite the temperatures used to sinter the ceramic, the embedded porous oxide support phase retains high surface area and preferably provides the monolithic support with an overall surface area of at least 8–10 $m^2/g$, more preferably at least 15–20 $m^2/g$.

The monolithic supports may have some catalytic activity of their own because of the chemistry and structure of the high surface area phase. The support may further carry additional catalytically active ingredients dispersed throughout, but generally more concentrated at the high surface area sites provided by the embedded porous oxide support phase. Additional catalytic ingredients can be incorporated into the monolith by depositing them onto the support bodies after fabricating and sintering the final structure. U.S. Pat. Nos. 2,742,437, 3,824,196 and 4,631,268 are hereby incorporated herein by reference.

Also, in an embodiment to be described with reference to the following Example 6, the honeycombed structures are formed of absorbent.

EXAMPLE 6

Two monoliths were made of pure solid absorbent, each was 2 inch long and one inch in diameter. The solid absorbent was spray-dried Mg—Al spinel-based FCC additive sold by W. R. Grace Company under the trade name DESOX. After first grinding to powder and wetting of the absorbent, the monoliths were formed by extrusion.

One monolith has 200 cell/$in^2$ viewed from either end, and the other is a 400 cell/$in^2$ size. The 400 cell/$in^2$ unit has smaller openings and thinner walls, giving better mass transfer and diffusion characteristics, so more of the intrinsic or ultimate SOx uptake capacity (~60 wt % $SO_3$/sorbent) of the absorbent is utilized before SOx breaks through at the exit end of the monolith. However, the 400 cell/in monolith has a higher pressure drop.

The test conditions were: 1200° F.; start with fresh or regenerated monolith (note: cycle-to cycle performance was stable, for the 5–10 cycles tested here); feed=1% $SO_2$, 4%

O$_2$ (dry basis) with balance N$_2$; and about 10% water content was added via a bubbler. Regeneration between cycles was also at 1200° F. using H$_2$. Run until SO$_2$ breakthrough at 5 ppm was detected. The % uptake was calculated as grams of SO$_3$ taken up per grams of monolith times 100.

TABLE II

| MONOLITH (cells/in$^2$) | FLOW RATE (cc/min) | UPTAKE (wt %) 5 ppm* | UPTAKE (wt %) 300 ppm* |
|---|---|---|---|
| 200 | 830 | 19.2 | 25.7 |
|  | 1660 | 9.6 | 16.1 |
| 400 | 830 | 48.7 | 53.0 |
|  | 1660 | 40.1 | 47.5 |

*@breakthrough

Measured uptakes increase with lower flow rate and smaller cell sizes, due to lower ratios of (a) desired SOx mass transfer (from the gas phase to the solid surface, and from the solid surface to the interior of the solid cell wall) to (b) convection through the monolith to the exit, where breakthrough is detected. Uptakes naturally are higher when "breakthrough" is defined as 300 ppm, rather than 5 ppm SO2 detected at the exit. GHSV at standard conditions (~60° F., 1 atm) was about 1900 hr-1 for 830 cc/min, 3800 for 1660 cc/min.)

While the invention has been described in conjunction with specific embodiments thereof, it is evident that many alternatives, modifications, and variations will be apparent to those skilled in the art in light of the foregoing description. Accordingly, it is intended to embrace all such alternatives, modification, and variations as fall within the spirit and broad scope of the appended claims.

What is claimed is:

1. A process for removing sulfur-containing gases including hydrogen sulfide and carbon monoxide from a gas stream comprising:
    (i) contacting the gas stream with (1) an oxygen-containing gas or (2) an oxygen-containing gas and fuel gas at reaction conditions to convert substantially all sulfur species in the gas stream to sulfur oxides;
    (ii) directing the gas stream containing the sulfur oxides and carbon monoxide into an absorber unit operated at a temperature of from about 900° F. to about 1,400° F., a pressure of from about 0.1 atmospheres to about 10 atmospheres, and a space velocity of from about 500 GHSV to about 20,000 GHSV, said absorber unit comprising a channel monolith including a solid sorbent of a magnesium aluminate spinel to convert sulfur dioxide to sulfur trioxide and to sorb substantially all of the sulfur trioxide on the solid sorbent, and to convert the carbon monoxide in the presence of oxygen to carbon dioxide to provide a sulfur oxide and carbon monoxide depleted stream for disposal;
    (iii) regenerating the solid sorbent by contacting said solid sorbent with a reducing gas including a hydrogen or a hydrocarbon bearing stream to release the sorbed sulfur oxides and form a hydrogen sulfide and/or sulfur dioxide bearing stream, and a regenerated solid sorbent; and
    (iv) directing the hydrogen sulfide and/or sulfur dioxide bearing stream to a sulfur plant for recovery of sulfur;
    wherein step (ii) is an oxidative-adsorption step, and step (iii) is a reductive-besorption step.

2. A process according to claim 1 in which the sorbed sulfur oxides are desorbed during the regeneration in the form of an off-gas comprising sulfur dioxide and passed to a Claus sulfur recovery process.

3. A process according to claim 2 in which the off-gas is passed to a Claus sulfur recovery process where the sulfur present in the off-gas in converted to elemental sulfur.

4. A process according to claim 1 in which the spinel contains a molar excess of magnesia.

5. A process according to claim 4 in which the spinel is Mg$_2$Al$_2$O$_5$.

6. A process according to claim 1 in which said solid sorbent comprises an oxidizing catalyst component which is capable of promoting the oxidation of sulfur dioxide to sulfur trioxide.

7. A process according to claim 6 in which the oxidizing catalyst component comprises a rare earth metal oxide.

8. A process according to claim 6 in which the oxidizing catalyst component comprises ceria.

9. A process according to claim 6 in which the oxidizing catalyst component comprises an oxide of a metal of Group 8 of the Periodic Table.

10. A process according to claim 6 in which the oxidizing catalyst component comprises an oxide of vanadium.

11. A process according to claim 6 in which the oxidizing catalyst component comprises platinum.

12. A process according to claim 1 in which said solid sorbent is regenerated in the presence of water.

13. A process according to claim 1 in which greater than 70 vol. % of sulfur in the off-gas from the regeneration is sulfur dioxide.

14. A process according to claim 1 in which step (i) is carried out with oxygen introduced into an incinerator in an amount sufficient to maintain an oxygen content of about 0.10 to about 10 vol. % in the gases passed to the sorbent.

15. A process according to claim 1 in which the absorber unit is operated at a gas hourly space velocity (GHSV) of about 2,000 to about 5,000, a pressure of about 1 to about 2 atmospheres, and a temperature of about 1,100 to about 1,350° F.

16. A process according to claim 1 in which the gas stream comprises the tail gas from a Claus sulfur recovery process.

17. A process according to claim 16 in which the tail gas stream comprises hydrogen sulfide and sulfur dioxide.

18. A process according to claim 1 in which said solid sorbent has a sulfur oxide uptake of at least 20% by weight.

19. A process according to claim 1 in which step (i) is carried out at a temperature of from about 900° F. to about 1,400° F.

20. A process according to claim 1 in which the off-gas formed in step (iii) comprises sulfur dioxide and hydrogen sulfide.

21. A process according to claim 1 in which the absorber unit is regenerated in step (iii) at a temperature of from about 900° F. to about 1,400° F., a pressure of from about 0.1 atmospheres to about 10 atmospheres, and a space velocity of from about 10 GHSV to about 1,000 GHSV.

22. A process according to claim 1 in which said solid sorbent includes an additional metal or metal oxide component, and in which the solid sorbent unit has a sulfur oxide uptake of at least 14.7 wt % during step (ii).

23. A process according to claim 1 in which the sorbed sulfur oxides are reduced to hydrogen sulfide and/or sulfur dioxide as said off-gas stream.

24. A process according to claim 23 in which, operating conditions of the absorber unit in step (iii) are controlled to provide a dominant off-gas sulfur species of either hydrogen sulfide or sulfur dioxide.

25. A process according to claim 24 in which, increasing the operating temperature of the absorber unit in step (iii) from 1,000–1,100° F. to 1,200° F. shifts the dominant off-gas sulfur species from hydrogen sulfide to sulfur dioxide.

26. A process according to claim 23 in which a second channel monolith includes a solid sorbent of the magnesium aluminate spinel to sorb substantially all of the sulfur oxides on the solid sorbent, and in which said gas stream containing the sulfur oxides is fed to the first one of the monoliths until the solid sorbent therein is spent with sorbed sulfur oxides; thereafter said gas stream containing the sulfur oxides is fed to the second one of the monoliths, and said reducing gas is fed to the first one of the monoliths to form said hydrogen sulfide and/or sulfur dioxide off-gas stream and thus regenerate first one of the monoliths.

27. The process of claim 1 wherein the channel monolith includes a plurality of longitudinally extending honeycombed structures extending between an inlet end and an outlet end of the channel monolith, the honeycombed structures having the solid absorbent on the inner surfaces thereof or being formed at least in part of solid absorbent, the sulfur oxide enriched gas stream and the reducing gas stream being alternately passed through the longitudinally extending honeycombed structures from the inlet end to the outlet end.

28. The process of claim 27 wherein said solid sorbent is impregnated with a rare earth.

29. The process of claim 27 wherein said solid sorbent is Mg/Al spinels.

30. The process of claim 27 wherein said solid sorbent is magnesium, aluminum-containing spinel impregnated with vanadium and cerium.

31. The process of claim 27 wherein said solid sorbent is magnesium aluminate impregnated with an oxygen promoter.

32. The process of claim 31 wherein said promoter is $CeO_2$ and/or Pt.

33. The method of claim 27 wherein at least substanially all of the monolith is formed of absorbent, and wherein the monolith has from about 25 cell/in$^2$ to about 800 cell/in$^2$.

34. The method of claim 33 wherein the honeycombed structures have a surface area of at least about 90 m$^2$/g.

35. The method of claim 33 wherein the honeycombed structures are formed from extruded absorbent having a surface area of at least about 130 m$^2$/g.

36. The method of claim 27 wherein the monolith has from about 50 cell/in$^2$ to about 400 cell/in$^2$.

37. The method claim 36 wherein each extruded honeycombed structure has a surface area at least about 90 m$^2$/g.

38. The method of claim 36 wherein each extruded honeycombed structure has a surface area at least about 130 m$^2$/g.

39. A process for removing sulfur-containing gases and carbon monoxide from a FCC regenerator fluegas stream comprising:
  (i) operating the regenerator of the FCC at reaction conditions to convert substantially all sulfur species including hydrogen sulfide in the gas stream to sulfur oxides to form a FCC regenerator fluegas stream that includes sulfur oxides and carbon monoxide;
  (ii) directing the FCC regenerator fluegas stream containing the sulfur oxides and carbon monoxide from the overhead of the FCC regenerator into an absorber unit operated at a temperature of from about 900° F. to about 1,400° F., a pressure of from about 0.1 atmospheres to about 10 atmospheres, and a space velocity of from about 500 GHSV to about 20,000 GHSV, said absorber unit comprising a channel monolith including a solid sorbent of a magnesium aluminate spinel to convert to sulfur dioxide to sulfur trioxide and to sorb substantially all of the sulfur trioxide on the solid sorbent, and to convert the carbon monoxide in the presence of oxygen to carbon dioxide to provide a SOx and CO depleted fluegas stream for disposal;
  (iii) regenerating the solid sorbent by contacting said solid sorbent with a reducing gas including a hydrogen or a hydrocarbon bearing stream to release the sorbed sulfur oxides and form a hydrogen sulfide and/or sulfur dioxide bearing stream, and a regenerated solid sorbant; and
  (iv) directing the hydrogen sulfide and/or sulfur dioxide bearing stream to a sulfur plant for recovery of sulfur;
  wherein step (ii) is an oxidative-adsorption step, and step (iii) is a reductive-desorption step.

40. A process according to claim 39 in which the absorber unit is regenerated in step (iii) at a temperature of from about 900° F. to about 1,400° F., a pressure of from about 0.1 atmospheres to about 10 atmospheres, and a space velocity of from about 10 GHSV to about 1,000 GHSV.

41. A process according to claim 40 in which, operating conditions of the absorber unit in step (iii) are controlled to provide a dominant off-gas sulfur species of either hydrogen sulfide or sulfur dioxide.

42. A process according to claim 41 in which, increasing the operating temperature of the absorber unit in step (iii) from 1,000 −1,100° F. to 1,200° F. shifts the dominant off-gas sulfur species from hydrogen sulfide to sulfur dioxide.

* * * * *